May 31, 1949. H. H. PACKWOOD 2,471,975
LAWN MOWER
Filed Jan. 17, 1947

INVENTOR
HEZA H. PACKWOOD
BY
John E. Hubbell
ATTORNEY

Patented May 31, 1949

2,471,975

UNITED STATES PATENT OFFICE 2,471,975

LAWN MOWER

Heza H. Packwood, Baton Rouge, La.

Application January 17, 1947, Serial No. 722,500

4 Claims. (Cl. 56—26)

The present invention relates to lawnmowers of the conventional type comprising front and rear rolling ground engaging elements mounted in a framework in which a rotary cutter, or cutting reel is journalled to turn about a horizontal axis. The rotary cutter or reel of such a lawnmower customarily comprises a plurality of helical cutting blades, the cutting edges of which cooperate with a non-rotatable bed knife mounted in the lawnmower framework to subject grass blades or stems or other vegetation coming into engagement with the bed knife cutting edge to a shearing or scissors-like cutting action.

When a lawnmower of the above mentioned type and of customary form is moved over the ground, tall stems and blades of grass or weeds, or other vegetation extending upward from the ground to a level of a few inches above the lawnmower cutting level are apt to be pressed downward out of the path of the bed knife by the cutting reel, or by the front rolling ground engaging element when the latter is in the form of a roller consisting of a single section extending between the lawnmower side frames in front of the bed knife and cutting reel, and of a plurality of end to end roll sections. In attempting to mow a lawn having such tall grass stems and blades or other vegetation with an ordinary lawnmower, it is customary to repeatedly move the lawnmower and to change the direction of lawnmower movement. However, even such procedure ordinarily fails to effect the severance of all the tall vegetation stems and blades at the desired cutting level.

The general object of the present invention is to provide a lawnmower of the above mentioned type with simple and effective means for moving relatively tall vegetation blades and stems into suitable engagement with the cutting edges of the lawnmower bed knife and cutting reel.

More specifically, the primary object of the present invention is to provide a lawnmower of the above mentioned type, with a ground engaging roller in front of the cutting reel, and means for rotating said roller with a peripheral speed which is substantially higher than the speed of the lawnmower movement over the ground. In consequence of its high peripheral speed, the front roller is in slipping contact with the ground and subjects the vegetation in its path of movement to a sort of combing action which tends to straighten vegetation blades and stems out along the ground and to cause them to extend backward from the points at which their rooted ends are attached to the ground. As the roller passes out of engagement with the backwardly directed stems and blades, the latter have a general tendency to raise their upper portions into the space in which the blades and stems are subjected to the shearing action of the helical blades and bed knife.

The present invention is adapted for use with lawnmowers of the above mentioned type and of the form in which the power used in operating the lawnmower is wholly manual. In such case the rear rolling ground engaging element, which may consist of a separate wheel at each side of the mower or may be a single long roll formed in one or more sections, may be geared or belt connected both to the cutting reel and to the front roller element to give them their respective high peripheral speeds. The invention may also be used with special advantage in lawnmowers of the above mentioned type provided with an electric or internal combustion engine supplying power for rotating the cutting reel, and preferably, for also rotating one or both of the front and rear rolling ground engaging elements.

A further object of the invention is to provide a lawnmower including a cutting reel and cooperating bed knife specially arranged and supported so as to cut grass and other vegetation closely adjacent uprising objects such as fences and shrubbery.

The various features of novelty which characterize my invention are pointed out with particularity in the claims annexed to and forming a part of this specification. For a better understanding of the invention, however, its advantages and specific objects attained with its use, reference should be had to the accompanying drawing and descriptive matter in which I have illustrated and described a preferred embodiment of the invention.

Figure 1:
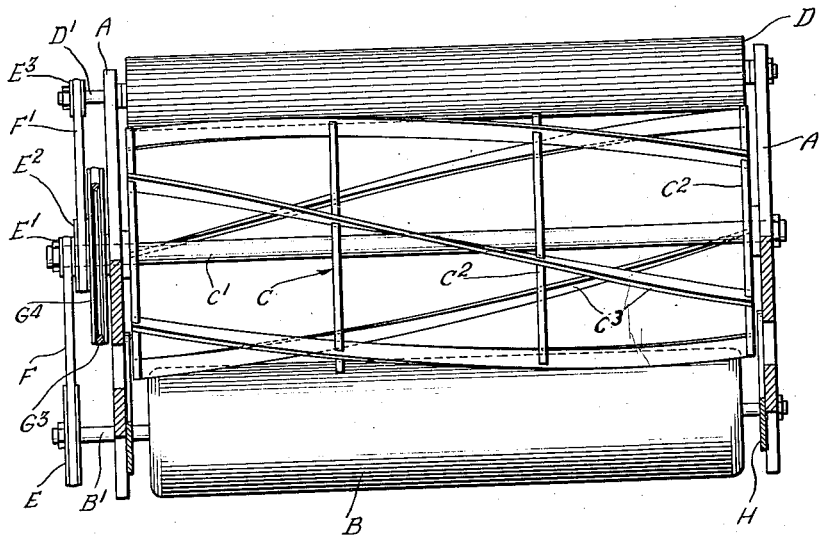
Fig. 1 is a plan section on the broken line I—I of Fig. 2.
Figure 2:
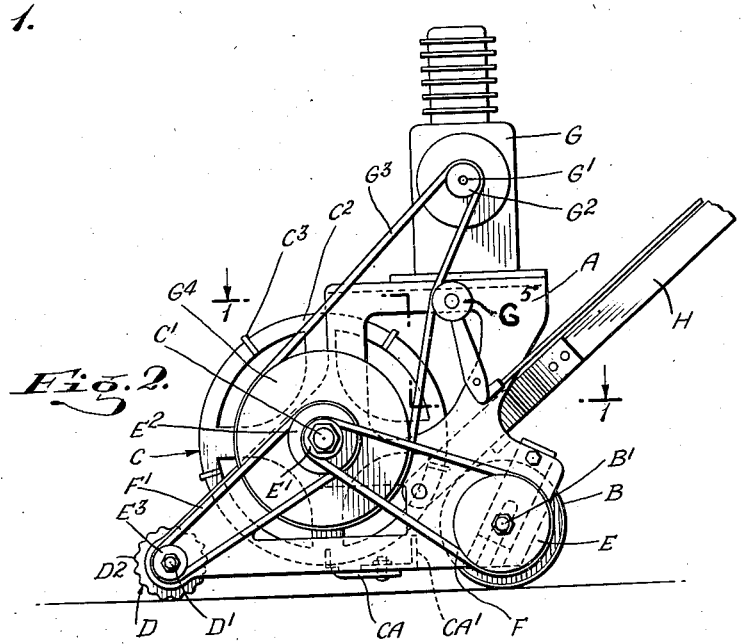
Fig. 2 is a side elevation of a motor driven lawnmower embodying the present invention.

The framework of the lawnmower construction somewhat diagrammatically illustrated, by way of example, in Figs. 1 and 2, comprises side frames A. A rear rolling ground engaging element B, a cutting reel C and a front rolling ground engaging roller D are shown as extending between and journalled in the side frames AA. The side frames also support a bed knife CA which is usually mounted on a bed knife supporting member CA′ extending between, and having its ends connected in any usual or suitable manner to the side frames A. As illustrated, the cutting reel C comprises a shaft C' extending axially through and supporting a series of blade supporting discs $C^2$ distributed along the length of the shaft, each formed with notches in which corresponding portions of elongated cutting blades $C^3$ are secured. The blades $C^3$ are curved or twisted to extend helically about the axis of the shaft C'. For the general purposes of the present invention it is immaterial whether the rear ground engaging element is in the form of the single long roller as shown, or is in the form of a separate roller section or wheel at each side of the mower. The lawnmower shown in Figs. 1 and 2 may include the customary adjustment provisions for adjusting the bed knife cutting edge as required to maintain the desired contact between the cutting edges of the bed knife CA and cutting reel C, and for adjusting one of the rollers, usually the front roller, relative to the framework, to raise or lower the cutting level. Since such adjustments of lawnmowers are common and form no part of the present invention, they need not be further referred to herein.

As shown in Fig. 1, the shaft C' and single rear ground engaging roller B are connected by gearing shown as comprising pulleys E and E' and a belt F. The pulley E is secured to and carried by the roller B. As shown, the pulley E is mounted on an extension B' of the shaft of the roller B. The pulley E' is mounted and secured to the corresponding end of the cutting reel shaft C'. The belt F runs over the pulleys E and E'. The cutting reel and front ground engaging roller D are also shown as connected by belt gearing comprising a pulley $E^2$ secured to one end of the reel shaft C', a pulley $E^3$ carried by a shaft extension D' of the roller D and a belt F'. The diameter of the pulleys E, E', $E^2$ and $E^3$ are so proportioned that in the normal movement of the lawnmower over the ground without slippage of the rear roller, the peripheral speed of the latter is equal to the speed of travel of the lawnmower, while the peripheral speed of the front ground engaging roller D will be substantially higher, preferably about twice as great as the lawnmower travel speed. Advantageously, and as shown, the peripheral speed of the cutting edges of the reel element C will be substantially higher than the peripheral speed of the front ground engaging roller D.

As shown in Fig. 2, the framework A of the lawnmower supports a driving motor G which ordinarily is an internal combustion engine. The motor G is provided with a driving shaft G' which, as shown in Fig. 2, supports a pulley $G^2$ which may be rigidly or clutch connected to the shaft G', and as shown, is operatively connected to a pulley $G^4$ secured to the cutting reel shaft C' by a belt $G^3$ when an idler pulley $G^5$ is adjusted to suitably tighten the belt $G^3$.

A handle H, which may be connected to the lawnmower framework A in the usual manner, is provided for use in guiding the movements of the lawnmower over the ground when the lawnmower propelling force is furnished by the motor G, and to transmit a propelling force as well as a guiding force to the lawnmower when the motor G is removed from the lawnmower framework, or is temporarily inoperative, and to apply a tilting force to the lawnmower framework and thereby transfer all of a portion of the weight of the lawnmower, normally borne in predetermined portions by the front and rear rolling ground engaging elements, from either of said elements to the other. The lawnmower framework may thus be tilted about the axis of the rear roller B for the customary purpose of lifting the front element D off the ground to temporarily raise the lawnmower cutting level when this becomes desirable because of the ground contour, or to facilitate the severance of vegetation blades or stems which are unusually tall.

By subjecting the framework to a tilting force raising, or tending to raise, the rear roller off the ground so as to interrupt the slippage of the front roller over the ground and to cause rear roller slippage, with the result of making the lawnmower speed of travel over the ground equal to the peripheral speed of the front roller. Such increase in lawnmower speed of travel may advantageously be effected in some cases to decrease the time required to mow grass which is so relatively short and sparse as to make the combing action of the front roller unnecessary.

As shown in Figs. 1 and 2, the front roller D is corrugated to provide peripheral rib projections $D^2$ which augment the effectiveness of the combing action of the roller D on the grass and other vegetation stems and blades when the peripheral speed of the roller D exceeds the lawnmower speed of travel over the ground. That combing action works said stems and blades into general parallelism with one another with their tops extending toward the oncoming bed knife CA and cutting reel C. As the front roller D passes out of the position in which it engages each such stem or blade, the top portion of the latter normally rises from the ground to a level above the bed knife CA so that as the lawnmower continues to approach, the top of said stem or blade will extend into the space between the bed knife and the adjacent helical blade $C^3$, moving into engagement with the bed knife.

Figure 3:
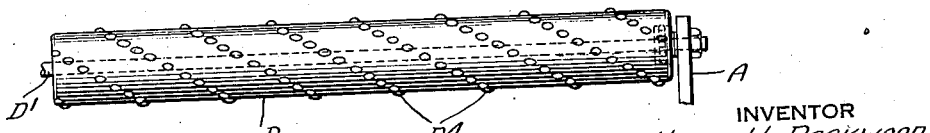
Fig. 3 is a plan view of a portion of a front ground engaging roller of modified form.

The form of the combing projections at the periphery of the front ground engaging roller may be varied. Thus, for example, the projections may be in the form of ribs which extend helically about the axis of the front roller, instead of being straight and parallel to said axis as shown in Figs. 1 and 2. Alternatively, said projections may be in the form of suitably distributed, radially extending short ribs, protuberances, or in the form of the short pin or toothlike projections $D^4$ shown in Fig. 3. The projections $D^4$ advantageously have blunt or rounded ends and should be short to avoid risk of an objectionable lawn roughening action. With the gearing through which the rollers B and D and the cutting reel C are rotated, located at one side of the lawnmower, as shown in Figs. 1 and 2, the end of the cutting reel at the opposite side of the lawnmower and the lawnmower cutting action, may be brought into close proximity to the corresponding side frame A, and in correspondingly close proximity to obstructions such as fences, shrubbery or the like.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent is:

1. A lawnmower comprising a framework, a cutting reel mounted in said framework to rotate about a horizontal axis and provided at its periphery with cutting edges extending longitudinally of the reel, a bed knife mounted in said framework and having a cutting edge in fixed relation to said framework and cooperating with said cutting reel cutting edges to sever vegetation, and rolling ground engaging elements journalled in said framework and including a roller element in front of said reel and parallel to the axis thereof, and mechanism for rotating said roller with a peripheral speed substantially in excess of the speed of the travel of the lawnmower over the ground and in the direction to cause vegetation extending upward from the ground to be bent backward toward the lawnmower bed knife and cutting reel.

2. A lawnmower as specified in claim 1 in which the roller element in front of the cutting reel is geared to a second ground engaging roller element for rotative movement of the latter with a peripheral speed substantially equal to the speed of lawnmower travel.

3. A lawnmower as specified in claim 1, including a rolling ground engaging element at the rear of the cutting reel, and a motor mounted on the lawnmower framework and driving connections between said motor and said rolling elements in front and at the rear of said cutting reel, arranged to drive the reel and the rolling element in front of the reel at peripheral speeds substantially higher than the peripheral speed at which the rolling element at the rear of the reel is rotated.

4. A lawnmower as specified in claim 1 including a framework comprising a side frame at one side of the lawnmower in which one end of the cutting reel is journalled, with the corresponding end of the cutting portion of the reel in close proximity to said frame, and including gearing at the opposite side of the lawnmower for rotating the reel and the rolling element in front of the reel each at peripheral speeds substantially higher than the peripheral speed of another of said rolling ground engaging elements which forms a traction element moving the lawnmower over the ground.

HEZA H. PACKWOOD.

REFERENCES CITED

The following references are of record in the file of this patent:

UNITED STATES PATENTS

| Number | Name | Date |
|---|---|---|
| 1,387,578 | Yost | Aug. 16, 1921 |
| 1,538,381 | Bull | May 19, 1925 |